United States Patent Office 3,118,892
Patented Jan. 21, 1964

3,118,892
ALKYL 18-DESOXY-18-ETHERIFIED MERCAPTO DESERPIDATES AND RELATED COMPOUNDS
Michael Mullen Robison, Berkeley Heights, Robert Armistead Lucas, Mendham, and Harold Belding MacPhillamy, Madison, N.J., assignors to Ciba Corporation, a corporation of Delaware
No Drawing. Filed Jan. 9, 1961, Ser. No. 81,250
7 Claims. (Cl. 260—287)

The present invention concerns 3-epi-allo-yohimbane compounds having the nucleus of the formula:

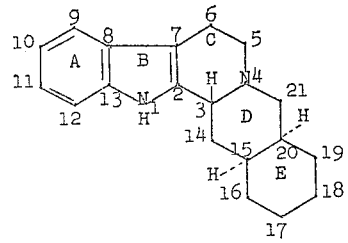

More particularly, it relates to 18-etherified mercapto-3-epi-allo-yohimbane 16-carboxylic acid esters, salts, N-oxides or salts of N-oxides of such compounds. Apart from the esterified carboxyl group in the 16-position, particularly the 16β-position, and the etherified mercapto group in the 18-position, the compounds of the present inventon may contain additional substituents. For example, a cyano group, or more especially a lower alkoxy group may be attached to the 17-position, having preferably the α-configuration. Other substituents, attached to the positions of the aromatic nucleus, i.e. ring A, of the molecule, which are available for substitution, more specifically to the 9-position, the 10-position, the 11-position and/or the 12-position, are represented, for example, by aliphatic hydrocarbon, such as substituted lower alkyl, for example, halogeno-lower alkyl, particularly trifluoromethyl, etherified hydroxyl, such as lower alkoxy, cycloalkyloxy, cycloalkyl-lower alkoxy, carbocyclic aryloxy, carbocyclic aryl-lower alkoxy, lower alkylenedioxy and the like, esterified hydroxyl, such as lower alkoxy-carbonyloxy, lower alkanoyloxy, halogeno and the like, etherified mercapto, such as lower alkylmercapto and the like, nitro, amino, such as N,N-disubstituted amino and the like, or any other suitable substituent. Other substituents, particularly aliphatic hydrocarbon radicals, such as lower alkyl, may also be attached to positions of other nuclei, particularly of the heterocyclic nucleus C, more specifically to the 5-position and/or the 6-position.

More especially, the invention is directed to compounds of the formula:

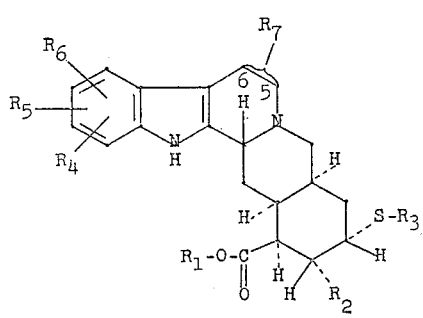

in which $R_1$ represents primarily lower alkyl, as well as substituted lower alkyl, such as, for example, monocyclic carbocyclic aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkyl-amino-lower alkyl and the like, $R_2$ stands primarily for lower alkoxy, as well as cyano, $R_3$ represents carbocyclic aryl, especially monocyclic carbocyclic aryl, or a carbocyclic aryl-aliphatic, especially a monocyclic carbocyclic aryl-aliphatic, radical, as well as an aliphatic radical, a heterocyclic, especially monocyclic heterocyclic, radical or a heterocyclic-aliphatic, especially a monocyclic heterocyclic-aliphatic, radical, each of the radicals $R_4$, $R_5$ and $R_6$ stands for hydrogen, aliphatic hydrocarbon, particularly lower alkyl, substituted aliphatic hydrocarbon, particularly substituted lower alkyl, such as halogeno-lower alkyl, especially trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-di-substituted amino and the like, or, whenever two of the groups $R_4$, $R_5$ and $R_6$ are attached to two adjacent positions and taken together, for lower alkylenedioxy, and $R_7$, attached to one of the positions 5 and 6, stands for hydrogen or lower alkyl, salts, N-oxides or salts of N-oxides of such compounds, as well as process for the preparation of such compounds.

The invention is also directed to compounds of the formula:

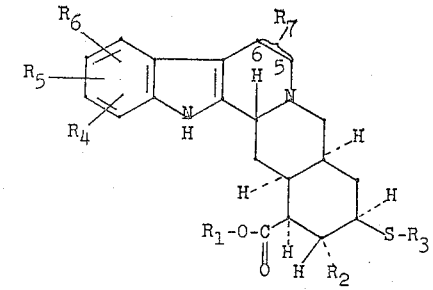

in which each of the groups $R_1$, $R_2$, $R_3$, $R_4$, $R_5$, $R_6$ and $R_7$ have the previously given meaning, salts, N-oxides or salts of N-oxides thereof, as well as process for the preparation of such compounds.

The radical of the alcohol portion of the ester grouping attached to the 16-position of the molecule, which, in the above formulae, is represented by the group $R_1$, stands above all for lower alkyl containing from one to seven, preferably from one to four, carbon atoms; such groups are particularly methyl, ethyl, n-propyl, isopropyl, n-butyl, isobutyl, secondary butyl, tertiary butyl, as well as n-pentyl, isopentyl, n-hexyl, n-heptyl and the like.

The esterifying portion of the ester grouping attached to the 16-position of the molecule, represented, for example, by the radical $R_1$ in the above formulae, may also stand for substituted lower alkyl, such as, for example, monocyclic carbocyclic aryl-lower alkyl, in which lower alkyl contains from one to four carbon atoms, such as phenyl-lower alkyl, e.g. benzyl, 1-phenylethyl, 2-phenylethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted lower alkyl radicals, as represented, for example, by the group $R_1$ in the above formulae, are, for example, lower alkyl radicals substituted by functional groups, such as etherified hydroxy, particularly lower alkoxy containing preferably from one to four carbon atoms, e.g. methoxy, ethoxy, n-propyloxy, isopropyloxy, n-butyloxy and the like, tertiary amino, such as N,N-di-lower alkyl-amino, in which lower alkyl contains from one to four carbon atoms, e.g. N,N-dimethylamino, N-ethyl-N-methylamino, N,N-diethylamino, N,N-di-n-propylamino, N,N-di-isopropylamino and the like, as well as 1-N,N-lower alkylene-imino, in which lower alkylene contains from four to six ring carbon atoms, e.g. 1-pyrrolidino, 1-piperidino, 1-N,N-hexamethyleneimino and the like, 1-N,N-lower oxa-alkylene-imino, in which lower oxa-alkylene contains preferably four ring carbon atoms, e.g. 4-morpholino and the like, or 1-N,N-lower aza-alkyleneimino, in which lower aza-alkylene contains from four to six ring carbon atoms, particularly 4-lower alkyl-1-piperazino, e.g. 4-methyl-1-piperazino, 4-ethyl-1-piperazino and the like. The lower alkyl portion in a lower alkyl radical, substituted by functional groups, as represented, for example, by etherified hydroxy-lower alkyl, tertiary amino-lower alkyl and the like, may be represented by a lower alkylene radical, which contains from two to four carbon atoms, and separates the described substituent, such as etherified hydroxyl, tertiary amino and the like, from the carbon atom of the carboxy group by at least two carbon atoms. Preferably, such lower alkylene radical contains from two to three carbon atoms and separates the substituent, such as the etherified hydroxyl group and the like, from the carboxy group by the same number of carbon atoms. The alkylene radicals are primarily 1,2-ethylene, 1-methyl-1,2-ethylene, 2-methyl-1,2-ethylene, 1,3-propylene, 1,4-butylene and the like. Lower alkyl radicals containing a functional group, which radicals are represented by $R_1$ in the above formulae, may be, for example, 2-lower alkoxy-ethyl, e.g. 2-methoxyethyl, 2-ethoxyethyl and the like, 2-lower alkoxy-propyl, e.g. 2-methoxypropyl and the like, 3-lower alkoxy-propyl, e.g. 3-methoxypropyl, 3-ethoxypropyl and the like, 2-N,N-di-lower alkyl-ethyl, e.g. 2-N,N-dimethylaminoethyl, 2-N,N-diethylaminoethyl and the like, 2-N,N-di-lower alkylamino-propyl, e.g. 2-N,N-dimethylaminopropyl and the like, 3-N,N-di-lower alkyl-amino-propyl, e.g. 3-N,N-dimethyl-aminopropyl, 3-N,N-diethylaminopropyl and the like, 2-(1-N,N-lower alkylene-imino)-ethyl, e.g. 2-(1-pyrrolidino)-ethyl, 2-(1-piperidino)-ethyl and the like, 3-(1-N,N-lower alkyleneimino)-propyl, e.g. 3-(1-piperidino)-propyl and the like.

The substituent attached to the 17-position, as represented by the group $R_2$ in the above formulae, may stand for cyano. It primarily represents lower alkoxy, which contains preferably from one to four carbon atoms, and stands for ethoxy, n-propyloxy, isopropyloxy, n-butyloxy, isobutyloxy and the like, but above all for methoxy.

The organic portion of the etherified mercapto group attached to the 18-position, as represented by $R_3$ in the above formulae, may stand, for example, for carbocyclic aryl, particularly monocyclic carbocyclic aryl, such as phenyl and phenyl substituted by one or more than one of the same of different substituents, such as lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, halogeno-lower alkyl, e.g. trifluoromethyl and the like, nitro, amino, such as N,N-di-lower alkyl-amino, e.g. N,N-dimethylamino and the like or any other suitable substituents. It may therefore represent, for example, phenyl, 3-methyl-phenyl, 4-methoxy-phenyl, 3,4-dimethoxy-phenyl, 3,4,5-trimethoxy-phenyl, 3,4-dichloro-phenyl, 4-bromo-phenyl, 3,5-dimethoxy-4-ethoxycarbonyloxy-phenyl, 3-N,N-dimethylamino-phenyl and the like.

The mercapto group of the 18-position may also be etherified by a carbocyclic aryl-aliphatic radical, particularly a monocyclic carbocyclic aryl-lower alkyl radical, such as phenyl-lower alkyl, e.g. benzyl, 1-phenyl-ethyl, 2-phenylethyl, diphenylmethyl and the like, or these radicals substituted by substituents, such as, for example, those mentioned hereinbefore as being attached to carbocyclic aryl radicals. Specific carbocyclic aryl-aliphatic groups, representing $R_3$ in the above formulae, for example, are, benzyl, 4-methyl-benzyl, 3,4-dimethoxy-benzyl, 3,4,5-trimethoxybenzyl, 2,5-dichlorobenzyl, 1-phenylethyl, 1-(4-methoxyphenyl)-ethyl, 2-phenylethyl, 2-(3,4-dimethoxy-phenyl)-ethyl, diphenylmethyl and the like.

The mercapto group in the 18-position may also be etherified by an aliphatic or cycloaliphatic radical; $R_3$ in the above formulae may, therefore, also represent lower alkyl, e.g. methyl, ethyl, n-propyl, nopropyl n-butyl and the like, lower alkenyl, e.g. allyl, 2-methylallyl and the like, cycloalkyl, e.g. cyclopentyl, cyclohexyl and the like, cycloalkyl-lower alkyl, e.g. cyclopentylmethyl, 2-cyclopentylethyl, cyclohexylmethyl, 1-cyclohexylethyl and the like, or any other suitable aliphatic radical.

Other etherified mercapto groups may contain as the organic radical, represented by $R_3$ in the above formulae, a heterocyclic or a heterocyclic-aliphatic group. Preferred are monocyclic heterocyclic aryl radicals, such as pyridyl, e.g. 2-pyridyl, 4-pyridyl and the like, thienyl, e.g. 2-thienyl and the like, or monocyclic heterocyclo-aliphatic groups, such as tetrahydrofuranyl, e.g. 2-tetrahydrofuranyl and the like, or monocyclic heterocyclic-lower alkyl radicals, such as, for example, pyridyl-lower alkyl, e.g. 2-pyridylmethyl and the like, tetrahydrofuranyl-lower alkyl, e.g. 2-tetrahydrofuranylmethyl and the like.

Substituents attached to any of the positions available for substitution in ring A, particularly those represented by the groups $R_4$, $R_5$ and $R_6$ (each of which may also stand for hydrogen) in the previously given formulae, may be, for example, lower aliphatic hydrocarbon, especially lower alkyl, containing preferably from one to four carbon atoms, e.g. methyl, ethyl, n-propyl, isopropyl, n-butyl and the like, or functional groups, such as, for example, etherified hydroxyl, particularly lower alkoxy, containing preferably from one to four carbon atoms, e.g. methoxy, ethoxy, n-propyloxy, isopropyloxy, n-butyloxy, isobutyloxy and the like, as well as cycloalkyloxy, in which cycloalkyl contains from three to eight, preferably from five to six, ring carbon atoms, e.g. cyclopenyloxy, cyclohexyloxy and the like, cycloalkyl-lower alkoxy, in which cycloalkyl contains from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, containing preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, halogeno, e.g. fluoro, chloro, bromo, iodo and the like, halogeno-lower alkyl, particularly trifluoromethyl and the like, or any other suitable functional group. A substituent may also be attached to two adjacent positions of ring A and form a fused-on ring; for example, two of the radicals R₄, R₅ and R₆ in the formulae, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C, which are available for substitution, are primarily aliphatic hydrocarbon, such as lower alkyl, containing preferably from one to four carbon atoms, particularly methyl, as well as ethyl, n-propyl, isopropyl and the like. The radical $R_7$ in the previously given formulae, which stands primarily for hydrogen, may, therefore, also represent lower alkyl, particularly methyl, as well as ethyl and the like.

Salts of the compounds of this invention are primarily therapeutically acceptable acid addition salts, particularly those with inorganic acids, such as mineral acids, e.g. hydrochloric, hydrobromic, sulfuric, phosphoric acids and the like, as well as with organic acids, e.g. acetic, tartaric, methane sulfonic acid and the like.

Also included within the scope of the present invention are the N-oxides of the above-mentioned compounds, as well as the therapeutically acceptable acid addition salts of these N-oxides, such as the addition salts with the above-mentioned inorganic, particularly mineral, and organic acids.

In view of the fact that several asymmetric carbon atoms are present in the compounds of this invention, the latter may be obtained in the form of a mixture of racemates, racemates or optically pure compounds.

The compounds of the present invention have sedative and tranquilizing effects on the central nervous system; some of them also show antihypertensive properties. Compared with the antihypertensive and sedative effects of naturally occuring Rauwolfia alkaloids, such as, for example, reserpine, deserpidine, rescinnamine and the like, compounds of this invention may have predominant sedative effects accompanied by negligible antihypertensive activities, or more pronounced antihypertensive properties with a low degree of tranquilizing and sedative effects.

The compounds of the present invention can, therefore, be used primarily as sedative and tranquilizing agents to relieve states of hyperactivity, tension and agitation, as, for example, associated with mental disturbances, anxiety and the like, or as antihypertensive agents to counteract hypertensive conditions, such as, for example, renal hypertensive conditions, such as, for example, renal hypertension, toxemia and the like.

Furthermore, the compounds of this invention are suitable in calming laboratory test animals, such as monkeys, cats and the like, as well as in the veterinary field to quiet animals, particularly chickens, turkeys and the like, as well as other domestic animals to facilitate handling during vaccination, shipment and the like.

The compounds of the present invention may also be used as intermediates for the manufacture of pharmacologically useful compounds. Thus, upon desulfurization, for example, in the presence of a hydrogenation catalyst, e.g. Raney nickel and the like, the 18-etherified mercapto group in an 18-etherified mercapto-3-epi-allo-yohimbane 16-carboxylic acid ester compound may be cleaved off, and 18-unsubstituted 3-epi-allo-yohimbane 16-carboxylic acid ester compounds, having predominately sedative and tranquilizing properties accompanied by negligible antihypertensive effects, can be obtained.

A preferred group of compounds having the above-given properties is represented by the formulae:

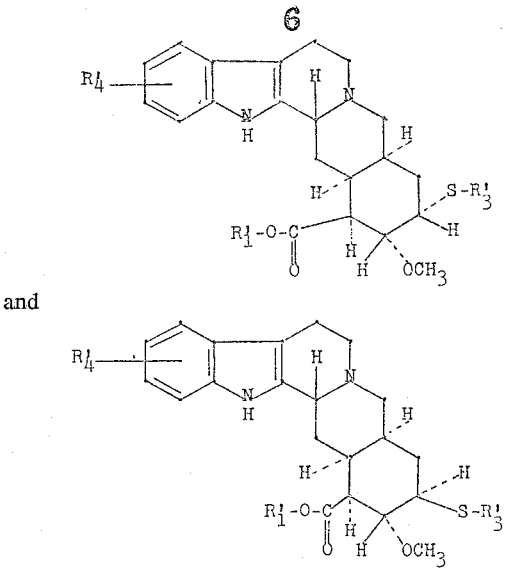

and in which formulae $R_1'$ represents lower alkyl, e.g. methyl, ethyl, n-propyl, isopropyl, n-butyl, isobutyl, n-pentyl, n-hexyl and the like, $R_3'$ represents monocyclic carbocyclic aryl, particularly phenyl, (lower alkyl)-phenyl, e.g. 3-methyl-phenyl 3,4,5-trimethyl-phenyl and the like, (lower alkoxy)-phenyl, e.g. 4-methoxy-phenyl, 3,4,5-trimethoxy-phenyl and the like, (halogeno)-phenyl, e.g. 3,4-dichloro-phenyl and the like, or any other suitable substituted phenyl group, or monocyclic carbocyclic aryl-lower alkyl, particularly phenyl-lower alkyl, e.g. benzyl, 1-phenylmethyl 2-phenyl-methyl, diphenyl-ethyl and the like, and (substituted phenyl)-lower alkyl, such as [(lower alkyl-)-phenyl]-lower alkyl, e.g. 3-methyl-benzyl, 1-(4-methyl-phenyl)-ethyl and the like, [(lower alkoxy)-phenyl]-lower alkyl, e.g. 3,4,5-trimethoxy-benzyl, 2-(2,5-dimethoxy-phenyl)-ethyl and the like, or any other suitably substituted phenyl-lower alkyl group, and $R_4'$ represents hydrogen or lower alkoxy, e.g. methoxy, ethoxy, n-propyloxy, isopropyloxy and the like, therapeutically acceptable acid addition salts, N-oxides or therapeutically acceptable acid addition salts of N-oxides thereof.

These compounds may be represented by the lower alkyl 18-desoxy-18-epi-(monocyclic carbocyclic aryl-mercapto)-reserpates, lower alkyl 18-desoxy-18-(monocyclic carbocyclic aryl-mercapto)-reserpates, lower alkyl 18-desoxy-18-epi-(monocyclic carbocyclic aryl-lower alkyl-mercapto)-reserpates and lower alkyl 18-desoxy-18-(monocyclic carbocyclic aryl-lower alkyl-mercapto)-reserpates, e.g. methyl 18-desoxy-18-epi-phenylmercapto-reserpate, methyl 18-desoxy-18-phenylmercapto-reserpate, methyl 18-desoxy-18-epi-(3,4,5-trimethoxy-phenylmercapto)-reserpate, methyl 18-epi-benzylmercapto-18-desoxy-reserpate, methyl 18-benzylmercapto-18-desoxy-reserpate, ethyl 18-desoxy-18-epi-phenylmercapto-reserpate, ethyl 18-desoxy-18-phenylmercapto-reserpate, ethyl 18-epi-benzylmercapto-18-desoxy-reserpate, n-propyl 18-desoxy-18-epi-phenylmercapto-reserpate, n-propyl 18-benzylmercapto-18-desoxy-reserpate, isopropyl 18-desoxy-18-epi-phenylmercapto-reserpate, isopropyl 18-desoxy-18-(3,4,5-trimethoxy-phenylmercapto)-reserpate, n-butyl 18-desoxy-18-epi-phenylmercapto-reserpate, n-butyl 18-benzylmercapto - 18 - desoxy-reserpate, isobutyl 18-desoxy-18-epi-phenylmercapto-reserpate, n-pentyl 18-desoxy-18-epi-(2-chloro-phenylmercapto)-reserpate, n-hexyl 18-desoxy-18-phenylmercapto-reserpate and the like. Other compounds of the above formula are the lower alkyl 18-desoxy-9-methoxy-18-epi-(monocyclic carbocyclic aryl-mercapto)-deserpidates, lower alkyl 18-desoxy-9-methoxy-18-(monocyclic carbocyclic aryl-mercapto)-deserpidates, lower alkyl 18-desoxy-9-methoxy-18-epi-(monocyclic carbocyclic aryl-lower alkyl-mercapto)-deserpidates and lower alkyl 18-desoxy-9-methoxy-18-(monocyclic carbocyclic aryl-lower alkyl-mercapto)-deserpidates, e.g. methyl 18-desoxy-9-methoxy-18-epi-phenylmercapto-deserpidate, methyl 18-desoxy-9-methoxy-18-phenylmercapto-deserpidate, methyl 18-epi-benzylmercapto-18-desoxy-9-methoxy-deserpidate, ethyl 18-desoxy-9-methoxy-18-epi-phenylmercapto-deserpidate and the like, the lower alkyl 18-desoxy-10-methoxy-18-epi-(monocyclic carbocyclic aryl-mercapto)-deserpidates, lower alkyl 18-desoxy-10-methoxy-18-(monocyclic carbocyclic aryl-mercapto)-deserpidates, lower alkyl 18-desoxy-10-methoxy-18-epi-(monocyclic carbocyclic aryl-lower alkyl-mercapto)-deserpidates and lower alkyl 18-desoxy-10-methoxy-18-(monocyclic carbocyclic aryl-lower alkyl-mercapto)-deserpidates, e.g. methyl 18-desoxy-10-methoxy-18-epi-phenylmercapto-deserpidate, methyl 18-desoxy-10-methoxy-18-phenylmercapto-deserpidate, ethyl 18-epi-benzylmercapto-18-desoxy-10-methoxy-deserpidate, methyl 18-desoxy-10-methoxy-18-epi-(3, 4, 5-trimethoxy-phenylmercapto)-deserpidate and the like, the lower alkyl 18-desoxy-11-ethoxy-18-epi-(monocyclic carbocyclic aryl-mercapto)-deserpidates, lower alkyl 18-desoxy-11-ethoxy-18-(monocyclic carbocyclic aryl-mercapto)-deserpidates, lower alkyl 18-desoxy-11-ethoxy-18-epi-(monocyclic carbocyclic aryl-lower alkyl-mercapto)-deserpidates and lower alkyl 18-desoxy-11-ethoxy-18-(monocyclic carbocyclic aryl-lower alkyl-mercapto)-deserpidates, e.g. methyl 18-desoxy-11-ethoxy-18-epi-phenylmercapto-deserpidate, methyl 18-epi-benzylmercapto-18-desoxy-11-ethoxy-deserpidate, methyl 18-desoxy-11-ethoxy-18-phenylmercapto-deserpidate, ethyl 18-desoxy-11-ethoxy-18-epi-(3,4,5-trimethoxy-phenylmercapto)-deserpidate and the like, lower alkyl 18-desoxy-12-methoxy-18-epi-(monocyclic carbocyclic aryl-mercapto)-deserpidates, lower alkyl 18-desoxy-12-methoxy-18-(monocyclic carbocyclic aryl-mercapto)-deserpidates, lower alkyl 18-desoxy-12-methoxy-18-epi-(monocyclic carbocyclic aryl-lower alkyl-mercapto)-deserpidates and lower alkyl 18-desoxy-12-methoxy-18-(monocyclic carbocyclic aryl-lower alkyl-mercapto)-deserpidates, e.g. methyl 18-desoxy-12-methoxy-18-epi-phenylmercapto-deserpidate, methyl 18-epi-benzylomercapto-18-desoxy-12-methoxy-deserpidate, ethyl 18-desoxy-12-methoxy-18-phenylmercapto-deserpidate and the like, lower alkyl 18-desoxy-18-epi-(monocyclic carbocyclic aryl-mercapto)-deserpidates, lower alkyl 18-desoxy-18-(monocyclic carbocyclic aryl-mercapto)-deserpidates, lower alkyl 18-desoxy-18-epi-(monocyclic carbocyclic aryl-lower alkyl-mercapto)-deserpidates and lower alkyl 18-desoxy-18-(monocyclic carbocyclic aryl-lower alkyl-mercapto)-deserpidates, e.g. methyl 18-desoxy-18-epi-phenylmercapto-deserpidate, methyl 18-desoxy-18-epi-(3,4,5-trimethoxy-phenylmercapto)-deserpidate, methyl 18-desoxy-18-phenylmercapto-deserpidate, ethyl 18-epi-benzylmercapto-18-desoxy-deserpidate and the like, or acid addition salts of such compounds. Other lower alkyl 18-desoxy-18-epi-(monocyclic carbocyclic aryl-mercapto)-deserpidates, lower alkyl 18-desoxy-18-(monocyclic carbocyclic aryl-mercapto)-deserpidates, lower alkyl 18-desoxy-18-epi-(monocyclic carbocyclic aryl-lower alkyl-mercapto)-deserpidates and lower alkyl 18-desoxy-18-(monocyclic carbocyclic aryl-lower alkyl-mercapto)-deserpidates, in which the six-membered aromatic portion of the pentacyclic nucleus contains lower alkyl, e.g. methyl, ethyl and the like, or halogeno, e.g. fluoro, chloro, bromo and the like, as substituents, or lower alkyl 18-desoxy-18-epi-(monocyclic carbocyclic aryl-mercapto)-reserpates, lower alkyl 18-desoxy-18-monocyclic carbocyclic aryl-mercapto)-reserpates, lower alkyl 18-desoxy-18-epi-(monocyclic carbocyclic aryl-lower alkyl-mercapto)-reserpates, lower alkyl 18-desoxy-18-(monocyclic carbocyclic aryl-lower alkyl-mercapto)-reserpates, lower alkyl 18-desoxy-18-epi-(monocyclic carbocyclic aryl-mercapto)-deserpidates, lower alkyl 18-desoxy-18-(monocyclic carbocyclic aryl-mercapto)-deserpidates, lower alkyl 18-desoxy-18-epi-(monocyclic carbocyclic aryl-lower alkyl-mercapto)-deserpidates and lower alkyl 18-desoxy-18-(monocyclic carbocyclic aryl-lower alkyl-mercapto)-deserpidates, in which the 5-position and/or the 6-position is substituted by methyl, or lower alkyl 18-desoxy-18-epi-(monocyclic carbocyclic aryl-mercapto)-reserpates, lower alkyl 18-desoxy-18-(monocyclic carbocyclic aryl-mercapto)-reserpates, lower alkyl 18-desoxy-18-epi-(monocyclic carbocyclic aryl-lower alkyl-mercapto)-reserpates, lower alkyl 18-desoxy-18-(monocyclic carbocyclic aryl-lower alkyl-mercapto)-reserpates, lower alkyl 18-desoxy-18-epi-(monocyclic carbocyclic aryl-mercapto)-deserpidates, lower alkyl 18-desoxy-18-(monocyclic carbocyclic aryl-mercapto)-deserpidates, lower alkyl 18-desoxy-18-epi-(monocyclic carbocyclic aryl-lower alkyl-mercapto)-deserpidates and lower alkyl 18-desoxy-18-(monocyclic carbocyclic aryl-lower alkyl-mercapto)-deserpidates, in which the 17α-methoxy group is replaced by other lower alkoxy groups, e.g. ethoxy, n-propyloxy and the like, or by cyano, or acid addition salts of such compounds, represent compounds within the scope of the present invention.

The compounds of this invention may be used as medicaments in the form of pharmaceutical preparations, which contain the new compounds or derivatives thereof, such as therapeutically acceptable acid addition salts, N-oxides or therapeutically acceptable acid addition salts of N-oxides thereof, in admixture with a pharmaceutical organic or inorganic, solid or liquid carrier suitable for enteral or parenteral administration. For making up the preparations there can be employed inert substances, which are compatible with the new compounds, such as water, gelatine, lactose, starches, stearic acid, magnesium stearate, stearyl acohol, talc, vegetable oils, benzyl alcohols, gums, waxes, propylene glycol, polyalkylene glycols or any other known inert carrier used in medicaments. The pharmaceutical preparation may be in solid form, for example, as tablets, capsules, dragees and the like, or in liquid form, for example, as solutions, suspension, emulsions and the like. If desired, they may contain additional substances, such as preserving, stabilizing, wetting, emulsifying agents and the like, salts for varying the osmotic pressure, buffers or any other auxiliary substances. They may also contain in combination, other therapeutically useful substances. The compounds of the present invention may be prepared, for example, by reacting an 18-organic sulfonyloxy-3-epi-allo-yohimbane 16-carboxylic acid ester, a salt, an N-oxide or a salt of an N-oxide thereof, with an organic thiol compound or a salt thereof, and, if desired, converting a resulting salt into the free base, and/or, if desired, converting a resulting compound into a salt thereof, and/or, if desired, converting a resulting mixture of isomers into the single isomers.

The organic radical of the organic sulfonyloxy group of the starting material, may be an aliphatic radical, such as, lower alkyl, e.g. methyl, ethyl,n-propyl, isopropyl and the like, or more especially a carbocyclic aryl, particularly a monocyclic carbocyclic aryl, radical which may be represented by phenyl, or advantageously by substituted phenyl. The latter is primarily a phenyl radical substituted by an electron-withdrawing substituent, especially halogeno, e.g. bromo and the like, or nitro, as well as, for example, carbo-lower alkoxy, e.g. carbomethoxy, carbethoxy and the like, carbamyl, cyano, or any other suitable electron-withdrawing group, or by other substituents, such as lower alkyl, especially methyl and the like. A carbocyclic aryl group may, therefore, be represented above all by 4-halogeno-phenyl, e.g. 4-bromo-phenyl and the like, nitro-phenyl, e.g. 3-nitro-phenyl, 4-nitro-phenyl and the like, or any other suitably substituted carbocyclic aryl group.

An organic thiol compound, especially a compound of the formula $R_3$—SH, in which $R_3$ has the above-given meaning, is more particularly a carbocyclic aryl-mercaptan or a carbocyclic aryl-aliphatic mercaptan, e.g. thiophenol, (lower alkyl)-thiophenol, (lower alkoxy)-thiophenol, (halogeno)-thiophenol and the like, or by monocyclic carbocyclic aryl-lower alkyl-mercaptan, such as phenyl-lower alkyl-mercaptan, e.g. benzylmercaptan, 2-phenylethyl-mercaptan and the like, or a ring-substituted phenyl-lower alkyl-mercaptan.

Treatment with the organic thiol compound may be carried out, for example, by using a salt especially an alkali metal, e.g. sodium and the like, salt of the thiol compound, and/or in the presence of an organic tertiary amine, particularly an aliphatic tertiary amine, such as an N,N,N-tri-lower alkyl-amine, e.g. N,N,N-trimethylamine, N-ethyl-N,N-dimethylamine, N,N-diethyl-N-methylamine, N,N,N-tri-ethylamine and the like, an N,N,N',N'-tetra-lower alkyl-lower alkylene-diamine, e.g. N,N,N',N'-tetramethyl-1,5-pentylene-diamine, N,N,N',N'-tetramethyl-1,6-hexylene-diamine, N,N,N',N'-tetraethyl-1,6-hexylenediamine, N,N,N',N'-tetramethyl-1,7-heptylene-diamine and the like, or of a heterocyclic tertiary base, e.g. pyridine, collidine and the like, or any other suitable organic base. Preferably, the reaction mixture is diluted by adding an inert solvent, such as, for example, ethanol, p-dioxane and the like, to ensure complete solution. The reaction is preferably completed at an elevated temperature, if necessary, in a closed vessel and/or in the atmosphere of an inert gas, such as nitrogen.

In the above reaction, epimerization at the 18-position occurs upon treatment with an organic thiol, i.e. a starting material having an 18β-organic sulfonyloxy group, yields an 18α-etherified mercapto-3-epi-allo-yohimbane 16-carboxylic acid ester-compound, and vice-versa.

The starting material may be prepared, for example, by treating an 18-hydroxy-3-epi-allo-yohimbane 16-carboxylic acid ester, a salt, an N-oxide or a salt of an N-oxide thereof with an organic sulfonyl halide, particularly an organic sulfonyl chloride, in the presence of a base, particularly an organic tertiary base, e.g. pyridine and the like, according to known methods. An 18β-organic sulfonyloxy-3-epi-allo-yohimbane 16-carboxylic acid, ester resulting from such esterification procedure, may be hydrolized with water in the presence of one of the previously described organic amines, e.g. N,N,N-triethylamine and the like, to yield the 18α-hydroxy-3-epi-allo-yohimbane 16-carboxylic acid ester compound, which may then be re-esterified with an organic sulfonic acid halide to yield an 18α-organic sulfonyloxy-3-epi-allo-yohimbane 16-carboxylic acid ester compound.

The compounds of the present invention may also be obtained, for example, by removal of a double bond extending from the 3-position in a Δ³-18-etherified mercapto-allo-yohimbene 16-carboxylic acid ester or a salt thereof, and, if desired, carrying out the optional steps.

The removal of the double bond may be carried out according to known methods, for example, by treatment with zinc in the presence of an acid, e.g. acetic, perchloric acid and the like, and of a suitable diluent, particularly a mixture of water and a water-miscible solvent, e.g. tetrahydrofuran, acetone and the like. The starting materials used in the above reaction may be carried out according to known synthetic routes using intermediates, which contain an etherified mercapto group in the 18-position or in the equivalent position in bicyclic intermediates used in the synthetic route.

Depending on the conditions used, the compounds of this invention are obtained in the form of the free bases or the salts thereof. A salt may be converted into the free base, for example, by reaction with a suitable base, such as, for example, silver oxide and the like, or with an anion exchange resin. A free base may be converted into its therapeutically useful acid addition salts by reaction with one of the inorganic or organic acids outlined hereinbefore, preferably in the presence of a suitable diluent.

The compounds of this invention may be obtained as a mixture of diastereoisomeric compounds, which may be separated into the individual racemic compounds on the basis of pysico-chemical differences such as solubility, for example, by fractionated crystallization and the like.

The racemates of the compounds of this invention may be resolved into the optically active d- and l-forms according to procedures known for the resolution of racemic compounds. For example, the free base of a racemic d,l-compound may be dissolved in a suitable solvent and one of the optically active forms of an acid containing an asymmetric carbon atom, or a solution thereof, is then added, whereupon a salt may be isolated, which is formed by the optically active acid with one of the optically active forms of the base. Especially useful as optically active forms of salt forming acids having an asymmetric carbon atom are D-tartaric (or l-tartaric acid) and L-tartaric acid (or d-tartaric acid), as well as the optically active forms of malic, mendelic, camphor-10-sulfonic, quinic acid and the like. From a resulting salt, the free and optically active base may be obtained according to processes known for the conversion of a salt into a base, and an optically active base may be converted into a therapeutically useful acid addition salts with one of the acids mentioned hereinbefore; these procedures are carried out according to the above-described methods. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a solution of 1.0 g. of sodium in 50 ml. of absolute ethanol is added 5.5 g. of thiophenol; the solution is then evaporated to dryness under reduced pressure. Dry benzene is added and the mixture again is taken to dryness; 100 ml. of acetonitrile and 2.85 g. of methyl 18-O-(4-methyl-phenyl-sulfonyl) reserpate, as described by L. Dorfman et al., Helv. Chim. Acta., vol 37, p. 59 (1954), are added to the residue. The reaction mixture is refluxed for one hour during which time a solid material precipitates. The solvent is evaporated, the residue is extracted with methylene chloride, and the organic solution is washed with a dilute aqueous solution of sodium hydroxide, water and a saturated solution of sodium chloride in water and is dried over sodium sulfate. The solvent is evaporated under reduced pressure; the residue is triturated with diethyl ether, and 1.52 g. of a solid material is filtered off and washed with diethyl ether. The desired methyl 18-desoxy-18-epi-phenylmercapto-reserpate of the formula:

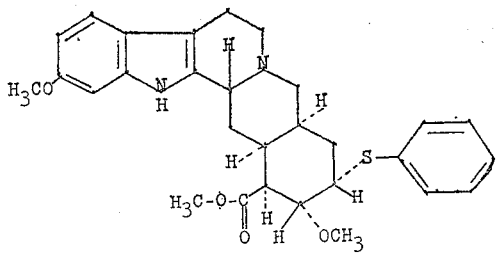

is purified by dissolving the solid material in a mixture of ethanol and methylene chloride and evaporating the latter M.P. 269–270°, $[\alpha]_D^{25} = +99°$ (in chloroform).

*Example 2*

A mixture of 3.17 g. of methyl 18-O-(4-bromo-phenyl-sulfonyl)-reserpate, 5.1 ml. of thiophenol and 11.1 ml. of N,N,N-triethylamine in 200 ml. of acetonitrile is heated to 100° while stirring for 22 hours. The reaction mixture is chilled, 1.93 of solid material is filtered off and washed with cold acetonitrile to yield the desired methyl 18-desoxy-18-epi-phenylmercapto-reserpate, M.P. 261–262.5° (with decomposition), which is identical with the compound obtained according to the procedure of Example 1.

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield: 5.64 g.

*Example 3*

A mixture of 1.9 g. of methyl 18-desoxy-17-epi-phenyl-thio-reserpate and 22 g. of Raney nickel in 100 ml. of ethanol and 80 ml. of p-dioxane is heated under reflux while stirring for two hours. The catalyst is filtered off and washed; the combined filtrates are evaporated and diethyl ether is added to the residue. The insoluble material is filtered off and recrystallized from a mixture of methanol and water to yield unreacted starting material. The mother liquor from the above recrystallization is evaporated to dryness and the residual gum is stirred with methylene chloride to yield a solid material, which is dissolved in a mixture of methanol and water. Upon addition of aqueous sodium hydroxide a gum is formed which is recrystallized from a mixture of methanol and water, and then from diethyl ether to yield methyl 18-desoxy-reserpate of the formula:

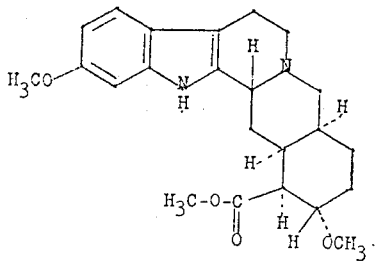

which melts at 196–197.5°; $[\alpha]_D^{25} = -78°$ (in chloroform).

*Example 4*

To a solution of 1.04 g. of sodium in 50 ml. of anhydrous methanol is added 6.2 g. of benzylmercaptan; the methanol, is then evaporated under reduced pressure. Benzene is added and the solvent is re-evaporated; the residue is diluted with 100 ml. of dry acetonitrile and treated with 2.85 g. of methyl 18-O-(4-methyl-phenyl-sulfonyl)-reserpate. The slurry is refluxed for one hour under an atmosphere of nitrogen. The solution is evaporated to dryness, the residue is treated with ice-water, and the mixture is extracted with methylene chloride. The organic solution is washed with a dilute aqueous solution of sodium chloride, then dried and evaporated. The resulting oil is washed with low-boiling petroleum ether by decanting the latter; the resulting and methylene chloride by evaporating most of the latter. The methyl 18-epi-benzylmercapto-18-desoxy-reserpate of the formula:

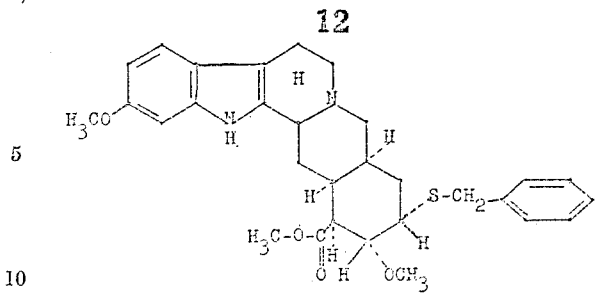

melts at 251–253°; $[\alpha]_D^{26} = +41°$ (in chloroform).

*Example 5*

To a mixture of 0.2 g. of sodium in 10 ml. of methanol is added 2.0 g. of 3,4,5-trimethoxy-thiophenol, the solvent is evaporated, and the residue is taken up in 75 ml. of acetonitrile; 2.85 g. of methyl 18-O-(4-methyl-phenyl-sulfonyl)-reserpate is added. The mixture is refluxed for one hour under an atmosphere of nitrogen, during which time a precipitate is formed. Most of the acetonitrile is evaporated under reduced pressure, the residue is treated with ice-water, and the resulting crystalline precipitate is filtered off and dissolved in methylene chloride. The solution is filtered through a diatomaceous earth preparation and is evaporated; the residue is crystallized from a mixture of ethanol and methylene chloride to yield the desired methyl 18-desoxy-18-epi-(3,4,5-trimethoxy-phenyl-mercapto)-reserpate of the formula:

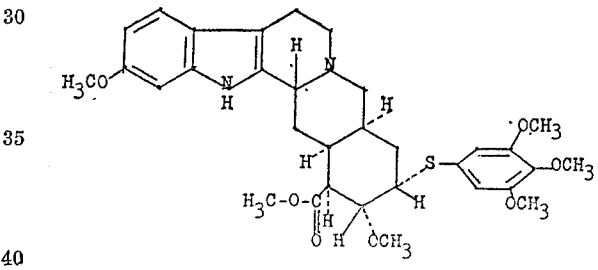

which melts at 262.5–264.5° (with decomposition).

The 3,4,5-trimethoxy-thiophenol used as the reagent may be prepared as follows: A total of 9.16 g. of 3,4,5-trimethoxyaniline is dissolved in a cold mixture of 12.5 ml. of concentrated hydrochloric acid and about 100 ml. of water. A total of 3.48 g. of sodium nitrite is slowly added while cooling in an ice-bath; the excess of hydrochloric acid is then buffered by adding 8.2 g. of solid anhydrous sodium acetate. The resulting solution is added over a period of fifteen minutes to a solution of 14.8 g. of potassium ethyl thiocarbamate in 50 ml. of water while vigorously stirring and maintaining a temperature of about 70 to 80°. Stirring and heating is continued for one hour. The cooled mixture is then extracted with benzene, the extracts are dried over sodium sulfate and evaporated. The residue is dissolved in 150 ml. of 95 percent ethanol, 6.0 g. of potassium hydroxide and 1.0 g. of glucose are added, and the solution is refluxed for three hours. Most of the ethanol is evaporated under reduced pressure, the residue is acidified with dilute sulfuric acid and a small amount of zinc dust is added. Steam is passed through the reaction mixture until about 5000 ml. of distillate is collected. Sodium chloride is added to the latter; the organic material is extracted with two portions of 500 ml. of diethyl ether. The organic extracts are dried, the solvent is evaporated, and the residue is twice distilled under reduced pressure; the crude material boils at 124–126°/1 mm. The distillate is taken up in 5 percent aqueous sodium hydroxide, the insoluble material is dissolved in diethyl ether, and the organic solution is separated from the aqueous layer. The latter is acidified with 10 percent hydrochloric acid, the organic material is extracted with diethyl ether, the organic solution is dried and evaporated to leave 2.97 g. of the yellow, crystalline 3,4,5-trimethoxy-thiophenol, M.P. 46–51°, which is distilled, B.P. 106–108°/0.5 mm.; the analytically pure sample melts at 45–46° after recrystallization from low-boiling petroleum ether and evaporative distillation in a sublimation apparatus at 110°/0.75 mm.

What is claimed:

1. A member selected from the group consisting of a compound having one of the formulae:

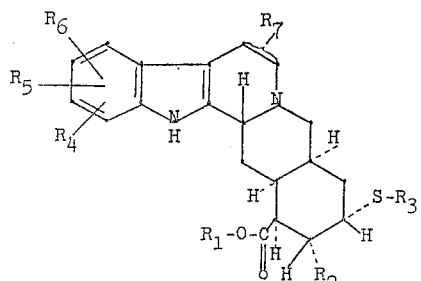

and

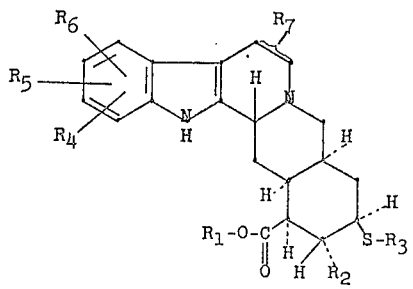

in which $R_1$ is a member of the group consisting of lower alkyl, phenyl-lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl amino is separated from the carboxyl group by at least two carbon atoms, $R_2$ is a member selected from the group consisting of lower alkoxy and cyano, $R_3$ stands for a member selected from the group consisting of phenyl, (lower alkyl)-phenyl, (lower alkoxy)-phenyl, (lower alkenyloxy)-phenyl, (halogeno)-phenyl, (lower alkoxy-carbonyloxy) - phenyl, (trifluoromethyl) - phenyl, (nitro)-phenyl, (N,N-di-lower alkyl-amino)-phenyl, phenyl-lower alkyl, (lower alkoxy)-phenyl-lower alkyl, (lower alkenyloxy)-phenyl-lower alkyl, (halogeno)-phenyl-lower alkyl, (lower alkoxy-carbonyloxy)-phenyl-lower alkyl, (trifluoromethyl) - phenyl - lower alkyl, (nitro) - phenyl-lower alkyl, (N,N-di-lower alkyl-amino)-phenyl-lower alkyl, lower alkyl, lower alkenyl, cycloalkyl, cycloalkyl-lower alkyl, pyridy, thienyl, tetrahydrofuranyl, pyridyl-lower alkyl and tetrahydrofuranyl-lower alkyl, each of the groups $R_4$, $R_5$ and $R_6$ is a member selected from the group consisting of hydrogen, lower alkyl, lower alkoxy, halogeno, lower alkyl-mercapto, and, whenever two of the groups $R_4$, $R_5$ and $R_6$ are attached to two adjacent positions and are taken together, lower alkylenedioxy, and $R_7$ stands for a member of the group consisting of hydrogen and lower alkyl, a pharmaceutically acceptable acid addition salt thereof, an N-oxide thereof, and a pharmaceutically acceptable acid addition salt of an N-oxide thereof.

2. A member selected from the group consisting of a compound having one of the formulae:

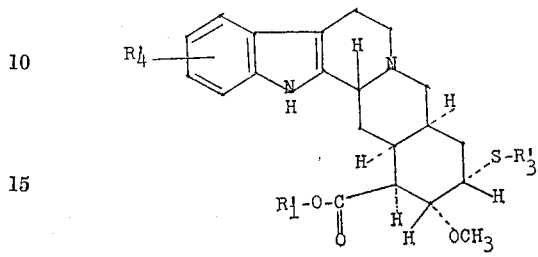

and

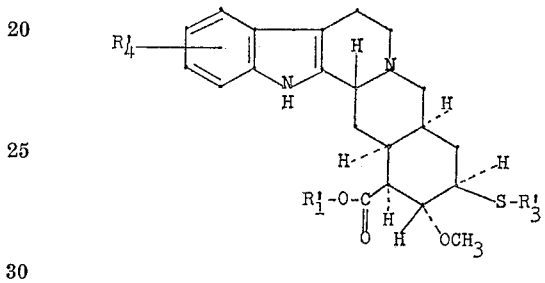

in which $R_1'$ is lower alkyl, $R_3'$ stands for a member selected from the group consisting of phenyl, (lower alkyl)-phenyl, (lower alkoxy)-phenyl, (halogeno)-phenyl, phenyl-lower alkyl, (lower alkyl)-phenyl-lower alkyl, and (lower alkoxy)-phenyl-lower alkyl, and $R_4'$ stands for a member of the group consisting of hydrogen and lower alkoxy, a therapeutically acceptable acid addition salt, an N-oxide and therapeutically acceptable acid addition salt of an N-oxide thereof.

3. Lower alkyl 18-desoxy-18-epi-(phenyl-mercapto)-reserpate.

4. Methyl 18-desoxy-18-epi-phenylmercapto-reserpate.

5. Methyl 18-desoxy-18-epi-(3,4,5-trimethoxy-phenyl-mercapto)-reserpate.

6. Lower alkyl 18-desoxy-18-epi-(phenyl-lower alkyl-mercapto)-reserpate.

7. Methyl 18-desoxy-18-epi-benzylmercapto-resperate.

References Cited in the file of this patent

Lowy et al.: Introduction to Org. Chem., Wiley, Inc., New York (1945), page 214.

Theilheimer: Synthetic Methods of Org. Chem., volume 1 (1954), page 261.

Robison et al.: Jour. Amer. Chem. Soc., volume 83 (June 20, 1961), pages 2695 and 2696.

South African Patent Abstract 60/3083, March 17, 1961 (Derwent Comm. Repts., volume 237, Gp. 3A, page 3).

South African Patent Abstract 60/3084, April 5, 1961 (Derwent Comm. Repts., vol. 237, Gp. 3A, page 3).

UNITED STATES PATENT OFFICE
CERTIFICATE OF CORRECTION

Patent No. 3,118,892                                       January 21, 1964

Michael Mullen Robison et al.

It is hereby certified that error appears in the above numbered patent requiring correction and that the said Letters Patent should read as corrected below.

Column 13, line 54, for "pyridy" read -- pyridyl --.

Signed and sealed this 16th day of June 1964.

(SEAL)
Attest:

ERNEST W. SWIDER
Attesting Officer

EDWARD J. BRENNER
Commissioner of Patents